(12) United States Patent
McGinnis

(10) Patent No.: US 9,039,899 B2
(45) Date of Patent: May 26, 2015

(54) OSMOTIC SEPARATION SYSTEMS AND METHODS

(75) Inventor: Robert L. McGinnis, Coventry, CT (US)

(73) Assignee: OASYS WATER, INC., Boston, MA (US)

( * ) Notice: Subject to any disclaimer, the term of this patent is extended or adjusted under 35 U.S.C. 154(b) by 498 days.

(21) Appl. No.: 13/454,499

(22) Filed: Apr. 24, 2012

(65) Prior Publication Data

US 2012/0267307 A1    Oct. 25, 2012

Related U.S. Application Data

(60) Provisional application No. 61/478,768, filed on Apr. 25, 2011, provisional application No. 60/479,187, filed on Apr. 26, 2011, provisional application No. 61/597,371, filed on Feb. 10, 2012.

(51) Int. Cl.
*B01D 61/00* (2006.01)
*B01D 65/08* (2006.01)
(Continued)

(52) U.S. Cl.
CPC ............... *B01D 65/08* (2013.01); *B01D 61/00* (2013.01); *B01D 61/002* (2013.01);
(Continued)

(58) Field of Classification Search
CPC .... B01D 29/00; B01D 29/0004; B01D 29/01; B01D 29/56; B01D 61/00; B01D 61/002; B01D 61/005; B01D 61/02; B01D 61/022; B01D 61/025; B01D 61/04; B01D 61/08; B01D 61/10; B01D 61/12; B01D 61/58; B01D 63/08; B01D 63/082; B01D 63/087; B01D 2311/08; B01D 2311/10; B01D 2311/25

USPC ......... 210/634, 638, 641, 642, 644, 648, 649, 210/650, 651, 652, 660, 681, 748.01, 766, 210/767, 768, 774, 806, 589, 260, 294, 295, 210/314, 316, 321.75, 433.1
See application file for complete search history.

(56) References Cited

U.S. PATENT DOCUMENTS 3,130,156 A    4/1964    Neff
3,171,799 A    3/1965    Batchelder
(Continued)

FOREIGN PATENT DOCUMENTS

CN    201186204 Y    1/2009
EP    0121099 A2    10/1984
(Continued)

OTHER PUBLICATIONS

"Prevention of Calcium Sulphate Crystallisation in Water Desalination Plants Using Slurry Precipitation and Recycle Reverse Osmosis (SPARRO)". Foundation for Water Research. Report 1372/1/06. Feb. 2006.
(Continued)

*Primary Examiner* — Allison Fitzsimmons
(74) *Attorney, Agent, or Firm* — Lando & Anastasi, LLP

(57) ABSTRACT

Separation processes using osmotically driven membrane systems are disclosed generally involving the extraction of solvent from a first solution to concentrate solute by using a second concentrated solution to draw the solvent from the first solution across a semi-permeable membrane. Enhanced efficiency may result from using low grade waste heat from industrial or commercial sources. Pre-treatment and post-treatment may also enhance the osmotically driven membrane processes.

16 Claims, 6 Drawing Sheets

(51) Int. Cl.
*B01D 61/02* (2006.01)
*B01D 61/58* (2006.01)
*C02F 1/44* (2006.01)
*B01D 63/08* (2006.01)
*C02F 1/04* (2006.01)

(52) U.S. Cl.
CPC ............ *B01D 61/025* (2013.01); *B01D 61/58* (2013.01); *B01D 2311/2669* (2013.01); *B01D 2311/2673* (2013.01); *C02F 1/04* (2013.01); *C02F 1/441* (2013.01); *C02F 1/445* (2013.01); *B01D 2321/185* (2013.01)

(56) References Cited

U.S. PATENT DOCUMENTS

| | | |
|---|---|---|
| 3,216,930 A | 11/1965 | Glew |
| 3,357,917 A | 12/1967 | Humphreys |
| 3,405,058 A | 10/1968 | Miller |
| 3,532,621 A | 10/1970 | Hough |
| 3,541,006 A | 11/1970 | Bixler |
| 3,562,152 A | 2/1971 | Davison |
| 3,617,547 A | 11/1971 | Halff et al. |
| 3,670,897 A | 6/1972 | Frank |
| 3,707,231 A | 12/1972 | Bradley |
| 3,721,621 A | 3/1973 | Hough |
| 4,083,781 A | 4/1978 | Conger |
| 4,141,825 A | 2/1979 | Conger |
| 4,142,966 A | 3/1979 | Perry |
| 4,161,445 A | 7/1979 | Coillet |
| 4,207,183 A | 6/1980 | Herrigel |
| 4,332,685 A | 6/1982 | Nowlin et al. |
| 4,334,992 A | 6/1982 | von Bonin et al. |
| 4,545,862 A | 10/1985 | Gore et al. |
| 4,574,049 A | 3/1986 | Pittner |
| 4,618,429 A | 10/1986 | Herrigel |
| 4,767,544 A | 8/1988 | Hamblin |
| 4,781,837 A | 11/1988 | Lefebvre |
| 4,808,287 A | 2/1989 | Hark |
| 5,098,575 A | 3/1992 | Yaeli |
| 5,221,477 A | 6/1993 | Melcher et al. |
| 5,266,203 A | 11/1993 | Mukhopadhyay et al. |
| 5,281,430 A | 1/1994 | Herron et al. |
| 5,382,365 A | 1/1995 | Deblay |
| 5,403,490 A | 4/1995 | Desai |
| 5,501,798 A | 3/1996 | Al-Samadi et al. |
| 5,695,643 A | 12/1997 | Brandt et al. |
| 5,925,255 A | 7/1999 | Mukhopadhyay |
| 6,368,849 B1 | 4/2002 | Norddahl |
| 6,375,848 B1 | 4/2002 | Cote et al. |
| 6,391,205 B1 | 5/2002 | McGinnis |
| 6,537,456 B2 | 3/2003 | Mukhopadhyay |
| 6,716,355 B1 | 4/2004 | Hanemaaijer et al. |
| 6,849,184 B1 | 2/2005 | Lampi et al. |
| 7,025,885 B2 | 4/2006 | Cote et al. |
| 7,320,756 B2 | 1/2008 | Mukhopadhyay |
| 7,455,109 B2 | 11/2008 | Collins |
| 7,560,029 B2 | 7/2009 | Mc Ginnis |
| 7,608,188 B2 | 10/2009 | Cath et al. |
| 7,727,400 B2 | 6/2010 | Flynn |
| 7,744,761 B2 | 6/2010 | Constantz et al. |
| 7,879,243 B2 | 2/2011 | Al-Mayahi et al. |
| 7,914,680 B2 | 3/2011 | Cath et al. |
| 8,021,549 B2 | 9/2011 | Kirts |
| 8,021,553 B2 | 9/2011 | Iyer |
| 8,029,671 B2 | 10/2011 | Cath et al. |
| 8,070,954 B2 | 12/2011 | Ito et al. |
| 8,852,436 B2 | 10/2014 | Rajagopalan et al. |
| 2005/0145568 A1 | 7/2005 | Mc Ginnis |
| 2006/0011544 A1 | 1/2006 | Sharma et al. |
| 2006/0144789 A1* | 7/2006 | Cath et al. ..................... 210/641 |
| 2006/0237366 A1* | 10/2006 | Al-Mayahi ................. 210/644 |
| 2007/0278153 A1 | 12/2007 | Oriard et al. |
| 2010/0032377 A1* | 2/2010 | Wohlert ........................ 210/652 |
| 2010/0108587 A1 | 5/2010 | McGinnis |
| 2010/0155333 A1 | 6/2010 | Husain et al. |
| 2010/0163471 A1 | 7/2010 | Elyanow et al. |
| 2010/0192575 A1 | 8/2010 | Al-Mayahi et al. |
| 2011/0062079 A1 | 3/2011 | Daines-Martinez et al. |
| 2011/0155665 A1 | 6/2011 | Cohen et al. |
| 2011/0155666 A1 | 6/2011 | Prakash et al. |
| 2011/0203994 A1 | 8/2011 | McGinnis et al. |
| 2011/0272355 A1 | 11/2011 | Rajagopalan et al. |
| 2012/0055867 A1 | 3/2012 | Shih et al. |
| 2012/0174639 A1 | 7/2012 | Herron |
| 2012/0180656 A1 | 7/2012 | Jeong et al. |
| 2012/0267308 A1 | 10/2012 | Carmignani et al. |
| 2012/0279921 A1 | 11/2012 | Nicoll |
| 2013/0001162 A1 | 1/2013 | Yangali-Quintanilla et al. |
| 2013/0048561 A1 | 2/2013 | Wilson et al. |
| 2013/0048564 A1 | 2/2013 | Stewart et al. |

FOREIGN PATENT DOCUMENTS

| | | |
|---|---|---|
| FR | 2102763 A5 | 4/1972 |
| GB | 1526836 A | 10/1978 |
| GB | 2442941 A | 4/2008 |
| GB | 2464956 A | 5/2010 |
| JP | 53-032885 A | 3/1978 |
| JP | 57-012802 A | 1/1982 |
| JP | 58-098199 | 6/1983 |
| JP | 06-063362 A | 3/1994 |
| JP | 2005-279540 A | 10/2005 |
| JP | 2008-100219 A | 5/2008 |
| JP | 2010-207748 A | 9/2010 |
| KR | 10-0697563 B1 | 3/2007 |
| KR | 2011-0045941 A | 5/2011 |
| KR | 101184651 B1 | 9/2012 |
| NL | 1035431 A1 | 12/2008 |
| SU | 1105727 A1 | 7/1984 |
| WO | 9323150 A1 | 11/1993 |
| WO | 9939799 A1 | 8/1999 |
| WO | 0105707 A1 | 1/2001 |
| WO | 2005012185 A1 | 2/2005 |
| WO | 2008059219 A1 | 5/2008 |
| WO | 2009155596 A2 | 12/2009 |
| WO | 2010067063 A1 | 6/2010 |
| WO | 2011004303 A1 | 1/2011 |
| WO | 2011053794 A2 | 5/2011 |
| WO | 2011059751 A2 | 5/2011 |
| WO | 2011133414 A2 | 10/2011 |
| WO | 2012102677 A1 | 8/2012 |
| WO | 20121120912 A1 | 9/2012 |
| WO | 2013025012 A1 | 2/2013 |

OTHER PUBLICATIONS

Achilli et al. "Pressure Retarded Osmosis: From the Vision of Sidney Loeb to the First Prototype Installation—Review". Desalination 261 (2010) pp. 205-211.

Achilli et al. "The Forward Osmosis Membrane Bioreactor: A Low Fouling Alternative to MBR Processes". Desalination 239 (2009) 10-21.

Bamaga et al. "Application of Forward Osmosis in Pretreatment of Seawater for Small Reverse Osmosis Desalination Units". Desalination and Water Treatment, vol. 5 (May 2009) 183-191.

Bamaga et al. "Hybrid FO/RO Desalination System: Preliminary Assesment of Osmotic Energy Recovery and Designs of New FO Membrane Module Configurations". Desalination 268 (2011) pp. 163-169.

Cath et al. "A Multi-Barrier Osmotic Dilution Process for Simultaneous Desalination and Purification of Impaired Water". Journal of Membrane Science 362 (2010). pp. 417-426.

Cath et al. "Forward Osmosis: Principles, Applications, and Recent Developments". Journal of Membrane Science 281:70-97 (2006).

Choi et al. "Toward a Combined System of Forward Osmosis and Reverse Osmosis for Seawater Desalination". Desalination 247 (2009) 239-246.

Chung et al. "Forward Osmosis Processes: Yesterday, Today, and Tomorrow". Desalination. 2011.

Gerstandt et al. "Membrane Processes in Energy Supply for an Osmotic Power Plant". Desalination 224 (2008) pp. 64-70.

(56) References Cited

OTHER PUBLICATIONS

Ghiu et al. "Permeability of Electrolytes Through a Flat RO Membrane in a Direct Osmosis Study". Desalination 144 (2002) 387-392.
Glueckauf et al. "Sea Water Softening by Osmosis Through Desalinating Membranes". Desalination 3 (1967) 155-168.
Gray et al. "Internal Concentration Polarization in Forward Osmosis: Role of Membrane Orientation". Desalination 197 (2006) pp. 1-8.
Holloway et al. "Forward Osmosis for Concentration of Anaerobic Digester Centrate". Water Research 41 (2007) pp. 4005-4014.
Kessler et al. "Drinking Water from Sea Water by Forward Osmosis". Desalination 18 (1976) 297-306.
Khalil et al. "A Novel, Safe, and Environmentally Friendly Technology for Water Production through Recovery of Rejected Thermal Energy from Nuclear Power Plants". Proceedings of ICONE14, International Conference on Nuclear Engineering. Miami, Florida. Jul. 17-20, 2005.
Khaydarov et al. "Solar Powered Direct Osmosis Desalination". Desalination 217 (2007) 225-232.
Lay et al. "Study of Integration of Forward Osmosis and Biological Process: Membrane Performance Under Elevated Salt Environment". Desalination Journal. © 2011 Elsevier B.V.
Loeb et al. "Energy Production at the Dead Sea by Pressure-Retarded Osmosis: Challenge or Chimera". Desalination 120 (1998) pp. 247-262.
Loeb et al. "Large Scale Power Production by Pressure-Retarded Osmosis, Using River Water and Sea Water Passing Through Spiral Modules". Desalination 143 (2002) 115-122.
Loeb et al. "One Hundred and Thirty Benign and Renewable Megawatts From Great Salt Lake? The Possibilities of Hydroelectric Power by Pressure-Retarded Osmosis". Desalination 141 (2001) pp. 85-91.
McCutcheon et al. "A Novel Ammonia-Carbon Dioxide Forward (Direct) Osmosis Desalination Process". Desalination 174:1-11. 2005.
McCutcheon et al. "Desalination by Ammonia-Carbon Dioxide Forward Osmosis: Influence of Draw and Feed Solution Concentrations on Process Performance". Journal of Membrane Science 278 (2006) 114-123.
McCutcheon et al. "The Ammonia-Carbon Dioxide Forward Osmosis Desalination Process". Water Conditioning and Purification; Oct. 2006.
McGinnis et al. "Energy Requirements of Ammonia-Carbon Dioxide Forward Osmosis Desalination". Desalination 207: 370-382. 2007.
McGinnis et al. "Forward Osmosis Desalination: Current Research and Future Prospects". For Presentation at the 2007 Conference of American Membrane Technology Association. Jul. 23-Jul. 27, 2007.
McGinnis et al. "Global Challenges in Energy and Water Supply: The Promise of Engineered Osmosis". Environ. Sci. Technol. 2008, 42, 8625-8629 (Online Dec. 1, 2008).
Mehta et al. "Internal Polarization in the Porous Substructure of a Semipermeable Membrane Under Pressure-Retarded Osmosis". Journal of Membrane Science 4 (1978) pp. 261-265.
Moody et al. "Forward Osmosis Extractors". Desalination 18 (1976) 283-295.
Osman et al. "Desalination/Concentration of Reverse Osmosis and Electrodialysis Brines with Membrane Distillation". Desalination and Water Treatment 24:293-301 (2010).
Panyor et al. "Renewable Energy from Dilution of Salt Water with Fresh Water: Pressure Retarded Osmosis". Desalination 199 (2006) pp. 408-410.
Phuntsho et al. "A Novel Low Energy Fertilizer Driven Forward Osmosis Desalination for Direct Fertigation: Evaluating the Performance of Fertilizer Draw Solutions". Journal of Membrane Science 375 (2011) 172-181.
Skilhagen et al. "Osmotic Power—Power Production Based on the Osmotic Pressure Difference Between Waters With Varying Salt Gradients". Desalination 220 (2008) pp. 476-482.
Tang et al. "Concentration of Brine by Forward Osmosis: Performance and Influence of Membrane Structure". Desalination 224 (2008) pp. 143-153.
Wallace et al. "A Thermodynamic Benchmark for Assessing an Emergency Drinking Water Device based on Forward Osmosis". Desalination 227 (2008) 34-45.
Williams et al. "Non-Therman Process for Recovering Reverse Osmosis Concentrate: Process Chemistry and Kinetics". Presented at the 2002 Water Quality Technology Conference, American Water Works Association, Nov. 10-14, 2002. Seattle, Washington.
Donnan et al., "The Theory of Membrane Equilibria", Physical Chemistry Laboratory, University College, London (Apr. 1924).
Zhao et al., "Recent Developments in Forward Osmosis: Opportunities and Challenges", Journal of Membrane Science, vol. 398, pp. 1-21 (2012).
Cornelissen et al. "Membrane Fouling and Process Performance of Forward Osmosis Membranes on Activated Sludge". Journal of Membrane Science 319 (2008). pp. 158-168.
Greenlee et al. "Reverse Osmosis Desalination: Water Sources, Technology, and Today's Challenges". Water Research vol. 43 (2009) pp. 2317-2348.
Hancock et al. "A Comparative Life Cycle Assessment of Hybrid Osmotic Dilution Desalination and Established Seawater Desalination and Wastewater Reclamation Processes". Water Research 46 (2012) pp. 1145-1154.
Hancock et al. "Solute Coupled Diffusion in Osmotically Driven Membrane Processes". Environ. Sci. Technol. (2009). pp. 6769-6775.
Kim et al. "Overview of Systems Engineering Approaches for a Large-Scale Seawater Desalination Plant with a Reverse Osmosis Network". Desalination 238 (2009). pp. 312-332.
Martinetti et al. "High Recovery of Concentrated RO Brines Using Forward Osmosis and Membrane Distillation". Journal of Membrane Science 331 (2009) pp. 31-39.
Phillip et al. "Reverse Draw Solute Permeation in Forward Osmosis: Modeling and Experiments". Environ. Sci. Technol. vol. 44 (2010). pp. 5170-5176.
Xiao et al. "Modeling Salt Accumlation in Osmotic Membrane Bioreactors: Implications for FO Membrane Selection and System Operation". Journal of Membrane Science vol. 366 (2011) pp. 314-324.
Yangali-Quintanilla et al. "Indirect Desalination of Red Sea Water with Forward Osmosis and Low Pressure Reverse Osmosis for Water Reuse". Desalination 280 (2011) pp. 160-166.

* cited by examiner

OSMOTIC SEPARATION SYSTEMS AND METHODS

CROSS-REFERENCE TO RELATED APPLICATIONS

This application claims the benefit of and priority to U.S. Provisional Patent Application Ser. Nos. 61/478,768, filed Apr. 25, 2011; 61/479,187, filed Apr. 26, 2011; and 61/597,371, filed Feb. 10, 2012; the entire disclosures of which are hereby incorporated herein by reference in their entireties for all purposes.

FIELD OF THE TECHNOLOGY

One or more aspects relate generally to osmotic separation. More particularly, one or more aspects involve use of osmotically driven membrane processes, such as forward osmosis to separate solutes from solutions.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass, but not salts, into the concentrated solution. Gradually, the water entering the concentrated solution dilutes the solution. The solutes are then removed from the dilute solution to generate potable water.

One drawback to forward osmosis systems is the ion exchange phenomena, which disturbs the ion balance of the system. For example, in a system using a $NH_3$—$CO_2$ draw solution and a NaCl feed solution, $Na^+$ and $NH_4^+$ ions will exchange across the membrane, which can result in a higher salinity product water and increased difficulty in recovering draw solutes. Some desalination units currently use pre and post-treatment ion exchange or similar processes; however, that use is typically done to further condition a product solvent and not in an attempt to overcome these drawbacks, in particular with respect to recovering draw solutes.

SUMMARY

Aspects relate generally to osmotically driven membrane systems and methods, including forward osmosis separation (FO), direct osmotic concentration (DOC), pressure-assisted forward osmosis, and pressure retarded osmosis (PRO).

In one aspect, the invention relates to an osmotically driven membrane process and method of maintaining the ion balance thereof. The process/method includes the steps of introducing a first solution to a first side of a forward osmosis membrane and introducing a concentrated draw solution to a second side of the forward osmosis membrane. The concentrated draw solution has a solute concentration sufficient to maintain an osmotic concentration gradient across the membrane. The process/method also includes promoting flow of a solvent from the first solution across the membrane, thereby forming a second solution on the first side of the forward osmosis membrane and a dilute draw solution on the second side of the forward osmosis membrane. The second solution includes at least one first ionic species of solute (e.g., ammonium) via reverse ion exchange through the membrane. Additionally, the process/method includes directing the dilute draw solution to a separation system and separating the dilute draw solution into draw solutes and the solvent. The recovered solvent includes at least one second ionic species of solute; for example, sodium ions ($Na^+$) that exchanged through the forward osmosis membrane and/or carbonate ions that remain present in the recovered solvent due to an ion imbalance that prevents all of the draw solutes from being recovered from the dilute draw solution. The ion imbalance can be a result of the ion exchange occurring across the forward osmosis membrane. The process/method also includes the steps of recycling the draw solutes into the concentrated draw solution introduced to the second side of the forward osmosis membrane to maintain the osmotic concentration gradient therein, directing the recovered solvent to a reverse osmosis system, pressurizing the recovered solvent to produce a purified solvent and a concentrated solution comprising the at least one second ionic species of solute, and introducing the concentrated solution to the first solution introduced to the first side of the forward osmosis membrane. The second ionic species of solute balances with the first ionic species of solute within the second solution to form additional removable draw solutes within the second solution. Specifically, the various positive and negative ionic species of solutes are resident within the second solution in equal charge balance. The second solution is then directed to a separation/recycling system to recover the additional draw solutes. The first ionic species of solute (or a form thereof) in combination with the second ionic species of solute (or a form thereof) makes each species of draw solute removable from the second solution.

Alternatively, the concentrated solution from the reverse osmosis unit can be introduced to the second solution on the first side of the membrane, the second solution within the separation/recycling system, and/or the second solution as it is transferred from the first side of the membrane to the separation/recycling system. In some embodiments, the concentrated solution from the reverse osmosis unit may have a greater number of total dissolved solids (TDS) than the first solution, in which case it would be preferable to introduce the concentrated solution to the second solution downstream of the forward osmosis unit, thereby avoiding the possible negative impact of the greater TDS on the forward osmosis unit. In some cases, the second solution may comprise additional ammonium from other sources, which can also be recovered with the disclosed systems and methods.

In another aspect, the invention relates to a method of maximizing draw solute recovery in an osmotically driven membrane system. The method includes the steps of providing a first osmotically driven membrane system having a forward osmosis membrane and configured for receiving a first solution on a first side of the membrane and a concentrated draw solution on a second side of the membrane, osmotically separating a solvent from the first solution using the concentrated draw solution, thereby forming a second solution on the first side of the membrane and a dilute draw solution on the second side of the membrane. The second solution includes at least one first ionic species of solute via reverse ion exchange through the membrane. The dilute draw solution can be directed to a separation/recycling system for further processing. The method also includes separating the dilute draw solution to recover at least one draw solute and the solvent. The recovered solvent includes at least one second ionic species of solute. The method further includes the steps of recycling the recovered at least one draw solute to the first osmotically driven membrane system; providing a second osmotically driven membrane system having a reverse osmosis membrane; pressurizing the recovered solvent in the second osmotically driven membrane system to recover a substantially pure solvent and a concentrated solution, including the at least one second ionic species of solute; and recycling the concentrated solution having the at least one second ionic species of solute to the first osmotically driven membrane system. The concentrated solution is added to the first solution, thereby resulting in the second solution including the at least one first ionic species of solute and the at least one second ionic species of solute. The at least one first species of solute balances with the at least one second species of solute to form additional removable draw solutes. The method includes the step of separating the second solution to recover the additional draw solutes and a third solution. The second solution can be directed to a second separation/recycling system or the separation step can be performed with the same separation/recycling system used with the dilute draw solution.

In various embodiments of the foregoing aspects, the process includes the step of recycling the additional draw solutes into the concentrated draw solution. In one or more embodiments, the step of separating the dilute draw solution comprises distillation. The concentrated draw solution can include at least one thermally removable draw solute and/or comprise ammonia and carbon dioxide in a molar ratio of at least 1:1.

In yet another aspect, the invention relates to a system for osmotic extraction of a solvent from a first solution. The system includes a forward osmosis system with a first chamber having an inlet fluidly connected to a source of the first solution, a second chamber having an inlet fluidly connected to a source of a concentrated draw solution, and a semi-permeable membrane system separating the first chamber from the second chamber; a first separation system fluidly coupled to the forward osmosis system downstream of the second chamber and configured to receive a dilute draw solution therefrom and to separate the dilute draw solution into draw solutes and a solvent stream; a pressure exchanger (e.g., a pump) fluidly coupled to the separation system and configured to pressurize and transport the solvent stream; a reverse osmosis system fluidly coupled to the pressure exchanger, wherein the reverse osmosis system includes a first chamber configured for receiving the pressurized solvent stream, a semi-permeable membrane coupled to the first chamber, and a second chamber coupled to the semi-permeable membrane and configured for receiving a solvent fluxed through the membrane. The first chamber of the reverse osmosis unit is fluidly coupled to the first chamber of the forward osmosis unit to provide at least a portion of the first solution. The system also includes a second separation system fluidly coupled to the first chamber of the forward osmosis system and configured for receiving a concentrated first solution therefrom and removing at least one of draw solutes and a product stream from the concentrated first solution.

In still another aspect, the invention relates to a system for osmotic extraction of a solvent from a first solution. The system includes a forward osmosis system configured for receiving a feed solution on one side of a semi-permeable membrane and a concentrated draw solution on an opposite side of the membrane, a first separation system fluidly coupled to the forward osmosis system and configured for receiving a dilute draw solution from the forward osmosis system and separating the dilute draw solution into draw solutes and a solvent stream, a pressure exchanger fluidly coupled to the separation system and configured to pressurize and transport the solvent stream, a reverse osmosis system fluidly coupled to the pressure exchanger and configured for receiving the pressurized solvent stream on a first side of a semi-permeable membrane and having an opposite side of the membrane for receiving a product solvent fluxed through the membrane, wherein the first side of the membrane is fluidly coupled to the forward osmosis unit to provide concentrated, pressurized solvent as at least a portion of the first solution, and a second separation system fluidly coupled to the forward osmosis system and configured for receiving a concentrated first solution therefrom and removing at least one of draw solutes and a product stream from the concentrated first solution.

In various embodiments of the foregoing aspects of the invention, the system includes a recycling system in fluid communication with the second separation system for returning the separated draw solutes to the concentrated draw solution. In one or more embodiments, the first and second separation systems can include at least one of a distillation column or a contact membrane. In certain embodiments, the concentrated draw solution includes ammonia and carbon dioxide in a molar ratio of at least one to one.

In yet another aspect, the invention relates to a system for osmotic extraction of a solvent from a first solution. The system includes a forward osmosis system, a pretreatment system, and a separation system. The forward osmosis system includes a first chamber having an inlet fluidly connected to a source of the first solution, a second chamber having an inlet fluidly connected to a source of a concentrated draw solution, and a semi-permeable membrane system separating the first chamber from the second chamber. The pretreatment system is in fluid communication with the source of the first solution and the forward osmosis system. In one embodiment, the pretreatment system is disposed between the source of the first solution and the forward osmosis system. The separation system is fluidly connected downstream of the second chamber to recover at least one of draw solutes or a solvent stream. The separation system can include at least one of a distillation column or a contact membrane, the separation system configured to receive a dilute draw solution from the second chamber.

In various embodiments, the concentrated draw solution includes ammonia and carbon dioxide in a desired molar ratio of at least one to one. The pretreatment system can include at least one of a heat source for preheating the first solution, means for adjusting the pH of the first solution, a filter or other means for filtering the first solution (e.g., carbon or sand filtration), means for polymer addition, or means for softening the first solution. The system can also include a post-treatment system in fluid communication with the solvent stream. The post-treatment system can include at least one of a reverse osmosis system, an ion exchange system, a second forward osmosis system, a distillation system, a pervaporator, a mechanical vapor recompression system, or a filtration system. In additional embodiments, the system can also include a recycling system including an absorber configured to facilitate reintroduction of the draw solutes to the second chamber to maintain the desired molar ratio of the draw solution.

In another aspect, the invention relates to a system for osmotic extraction of a solvent from a first solution. The system includes a forward osmosis system, a separation system, and a post-treatment system. The forward osmosis system includes a first chamber having an inlet fluidly connected to a source of the first solution, a second chamber having an inlet fluidly connected to a source of a concentrated draw solution, and a semi-permeable membrane system separating the first chamber from the second chamber. The separation system is fluidly connected downstream of the second chamber to recover at least one of draw solutes or a solvent stream. The post-treatment system is in fluid communication with the solvent stream.

In various embodiments, the concentrated draw solution includes ammonia and carbon dioxide in a desired molar ratio of at least one to one. The post-treatment system can include at least one of a reverse osmosis system, an ion exchange system, a second forward osmosis system, a distillation system, a pervaporator, a mechanical vapor recompression system, or a filtration system. The system can also include a pretreatment system in fluid communication with the source of the first solution, for example, the pretreatment system can be disposed between the source of the first solution and the forward osmosis system. The pretreatment system can include at least one of a heat source for preheating the first solution, means for adjusting the pH of the first solution, a filter or other means for filtering the first solution (e.g., carbon or sand filtration), means for polymer addition, or means for softening the first solution. The system can also include a recycling system including an absorber configured to facilitate reintroduction of the draw solutes to the second chamber to maintain the desired molar ratio of the draw solution. In some embodiments, the separation system includes at least one of a distillation column or a contact membrane, the separation system configured to receive a dilute draw solution from the second chamber.

In accordance with one or more embodiments, a system for osmotic extraction of a solvent from a first solution may comprise a first chamber having an inlet fluidly connected to a source of the first solution, a second chamber having an inlet fluidly connected to a source of a concentrated draw solution comprising ammonia and carbon dioxide in a desired molar ratio of at least one to one, a semi-permeable membrane system separating the first chamber from the second chamber, a pretreatment operation in fluid communication with at least one of the source of the first solution or the first chamber, a separation system fluidly connected downstream of the second chamber, the separation system configured to receive a dilute draw solution from the second chamber and to recover draw solutes and a solvent stream, a recycle system comprising an absorber configured to facilitate reintroduction of the draw solutes to the second chamber to maintain the desired molar ratio, and a post-treatment operation in fluid communication with the solvent stream. In one embodiment, the separation system includes a distillation column.

Additional aspects of the invention relate to utilizing the systems and processes described herein to treat wastewater. In accordance with one or more embodiments, a method of treating wastewater may include introducing wastewater having a high biochemical oxygen demand or a high chemical oxygen demand on a first side of a semi-permeable membrane, introducing a concentrated draw solution including ammonia and carbon dioxide at a molar ratio of at least one to one on a second side of the semi-permeable membrane to maintain a desired osmotic concentration gradient across the semi-permeable membrane, promoting flow of at least a portion of the wastewater across the semi-permeable membrane to form a second solution on the first side of the semi-permeable membrane and a dilute draw solution on the second side of the semi-permeable membrane, and introducing at least a portion of the dilute draw solution to a separation operation to recover draw solutes and a solvent stream. The method can also include the optional steps of reintroducing the draw solutes to the second side of the semi-permeable membrane to maintain the desired molar ratio of ammonia to carbon dioxide in the concentrated draw solution and collecting the solvent stream.

In some embodiments, the method may further include introducing the second solution to a secondary process, such as an anaerobic digester. In other embodiments, the method may further include introducing the second solution to an incinerator. Heat generated from the incinerator or from the combustion of methane from the digester may be provided to the separation operation. In at least some embodiments, the method may further include controlling fouling of the semi-permeable membrane.

In another aspect, the invention relates to a forward osmosis process. The process includes the steps of introducing a first solution having a solvent and at least one solute on a first side of a semi-permeable membrane, introducing a plurality of precipitate nucleation crystals ("seeds") to the first solution, introducing a concentrated draw solution to a second side of the semi-permeable membrane, promoting nucleation of the at least one solute in the first solution, and promoting a flow of at least a portion of the solvent across the semi-permeable membrane to form a second solution on the first side of the semi-permeable membrane and a dilute draw solution on the second side of the semi-permeable membrane. The plurality of seeds can include seeds of substantially uniform composition and configuration; however, seeds having different compositions and/or configurations can be introduced for the selective nucleation of different solutes. The quantity, composition, and configuration of the seeds will be selected to suit a particular application; e.g., the recovery of a pharmaceutical compound and/or the removal of undesirable solutes. The step of promoting nucleation can include the introduction and passive dispersal of the seeds within the solution and optionally the agitation, aeration, or other means of promoting mixing of the seeds within the first solution.

In various embodiments of the foregoing aspect, the process can include the step of directing at least a portion of the dilute draw solution to a separation unit to recover at least one of a solvent stream or draw solutes and the step of reintroducing draw solutes into the concentrated draw solution on the second side of the semi-permeable membrane to maintain a desired molar ratio in the concentrated draw solution. In one embodiment, the step of promoting a flow of at least a portion of the solvent includes maintaining the osmotic concentration gradient across the semi-permeable membrane, which can include maintaining a molar ratio of ammonia and carbon dioxide of at least 1:1 in the concentrated draw solution. Optionally, the process can include the step of monitoring one or more characteristics of the concentrated draw solution and modifying the draw solution as necessary by, for example, reintroducing draw solutes onto the solution to alter the molar ratio thereof. The process can also include the step of recovering at least a portion of the at least one solute precipitated out of the first solution. Recovery of the precipitated solute can include further processing of the solutes and/or first solution by, for example, filtration, gravitational settling (e.g., in a separate chamber), classification and preferential precipitation of the solutes, heat exchange, or other means of separation. In certain embodiments, for example, when the precipitated solutes include or entrain organic substances, the precipitated solutes or slurry can be directed to an incinerator or digester for further processing.

In another aspect, the invention relates to a system for the processing of a solution using osmosis. The system includes a forward osmosis module and means for introducing a plurality of seeds into the forward osmosis module. The forward osmosis module includes a first chamber in fluid communication with a source of a first solution including a solvent and at least one solute, a second chamber in fluid communication with a concentrated draw solution and a semi-permeable membrane coupling the first chamber and the second chamber. The means for introducing the plurality of seeds is configured to introduce the seeds into the first chamber, where the plurality of seeds cause nucleation of at least a portion of the at least one solute when the first solution is introduced into the first chamber. The means for introducing the plurality of seeds can include recycling of a portion of removed precipitation crystals from elsewhere in the system, or from a hopper disposed adjacent the first chamber for providing, with or without metering, the seeds into the first chamber or a separate system including, for example, a reservoir for holding the plurality of seeds (as either dry crystals or in a slurry) and the necessary pump (or other prime mover), plumbing, and valves for delivering the seeds from the reservoir to the first chamber. The means and/or the first chamber can also include an air source, a mixer, and/or baffles to assist in the introduction and dispersal of the seeds within the first solution.

In one or more embodiments, the system can include a separation module in fluid communication with the second chamber for recovering at least one of a solvent stream and draw solutes and means for recycling draw solutes into the concentrated draw solution. The separation module and recycling means can include, for example, additional chambers, filters, heat exchangers, distillation columns, contact membranes, and piping as necessary to recover and reintroduce the draw solutes to the concentrated draw solution. The system can also include a recovery module in fluid communication with the first chamber for recovering precipitated solutes. The recovery module can include, for example, a settling tank, filters, an incinerator and/or a digester (e.g., where precipitation occurs with BOD or COD concentration).

In yet another aspect, the invention relates to an apparatus for the treatment of a solution using osmosis. The apparatus includes a chamber configured for receiving a first solution including a solvent and at least one solute, a membrane module disposed within the chamber; and means for introducing a plurality of seeds into the chamber, wherein the plurality of seeds cause nucleation of at least a portion of the at least one solute in the first solution in the chamber. The membrane module includes a semi-permeable membrane having an exterior surface in fluid communication with the first solution in the chamber and an interior surface for receiving a concentrated draw solution.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

Figure 1:
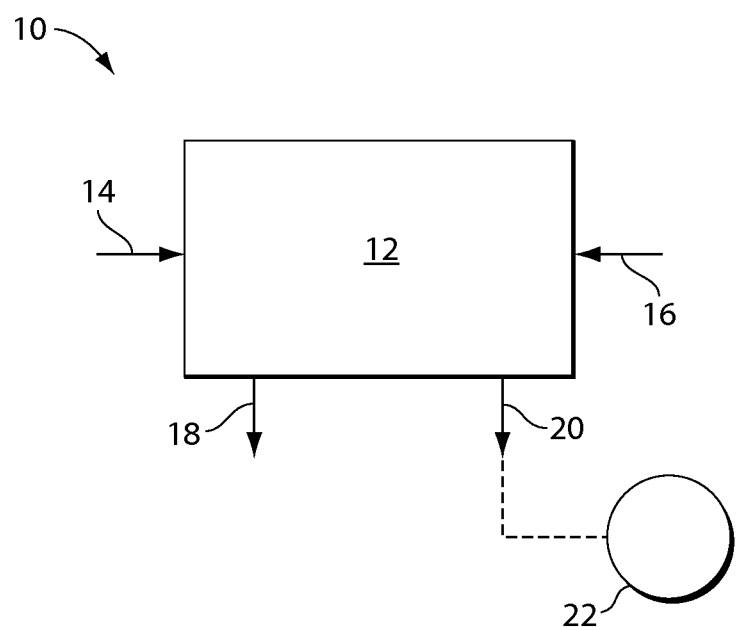
FIG. 1 is a schematic representation of a forward osmosis system/process for wastewater treatment in accordance with one or more embodiments of the invention.

In accordance with one or more embodiments, an osmotic method for extracting a solvent (e.g., water) from a solution may generally involve exposing the solution to a first surface of a forward osmosis membrane. A second solution, or draw solution, with an increased concentration relative to that of the first or process solution may be exposed to a second opposed surface of the forward osmosis membrane. Solvent may then be drawn from the solution through the forward osmosis membrane and into the second solution generating a solvent-enriched solution via forward osmosis that utilizes fluid transfer properties involving movement from a less concentrated solution to a more concentrated solution. The solvent-enriched solution, also referred to as a dilute draw solution, may be collected at a first outlet and undergo a further separation process to produce, for example, purified water. A second product stream, e.g., a depleted or concentrated process solution, may be collected at a second outlet for discharge or further treatment.

Hydraulic pressure may generally promote transport of the first and second solutions through a membrane module along a longitudinal axis of their respective channels, while osmotic pressure may generally promote transport of solvent across a forward osmosis membrane in the module from the feed to the draw solution. Alternatively, hydraulic pressure may be exerted on the feed solution to assist the flow of solvent from the feed to draw solutions, or hydraulic pressure may be placed on the draw solution to allow the production of power from the expansion of the volume of the draw solution due to membrane flux of solvent from the feed solution driven by the osmotic pressure difference between the two solutions (PRO). Generally, flow channels within the module are designed to minimize the hydraulic pressure necessary to cause flow through these channels (cross-flow), but this is often at odds with the desire to create turbulence in the flow channels, beneficial for efficient generation of osmotic pressure difference between the two solutions, which has a tendency to increase resistance to flow. Higher osmotic pressure differences may generally increase transmembrane flux, but may also have a tendency to increase the amount of heat required to separate the draw solutes from the dilute draw solution for production of a dilute water product and a reconcentrated draw solution.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of water (i.e., the solvent) while blocking the passage of the solutes and not reacting with the solutes in the solution. The membrane can have a variety of configurations including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyamide and acrylonitrile co-polymers may be used. Other membranes may be mineral membranes or ceramic membranes made of materials such as $ZrO_2$ and $TiO_2$.

Preferably, the material selected for use as the semi-permeable membrane should generally be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0-100 degrees Celsius. In some non-limiting embodiments, process temperatures may range from about 40-50 degrees Celsius. Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and 11. In certain non-limiting embodiments, the pH level may be about 7 to 10. The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

A separation process in accordance with one or more embodiments may involve exposing a first solution to a first surface of a semi-permeable membrane. A second solution that has a concentration greater than that of the first solution may be exposed to a second opposed surface of this membrane. In some embodiments, the concentration of the second solution may be increased by using a first reagent to adjust the equilibrium of solutes within the second solution to increase the amount of a soluble species of solute within the second solution. The concentration gradient between the first and second solutions then draws the solvent from the first solution through the semi-permeable membrane and into the second solution producing a solvent-enriched solution. In accordance with one or more embodiments, a portion of the solutes may be recovered from the solvent-enriched second solution and recycled to the draw solution. The recovery process may yield a solvent product stream. The concentration gradient also produces a depleted solution on the first side of the semi-permeable membrane that may be discharged or further processed. The depleted solution may include one or more target species of which concentration or recovery is desired.

In accordance with one or more embodiments, an apparatus for the extraction of a solvent from a first solution using osmosis is disclosed. In one non-limiting embodiment of the apparatus, the apparatus has a first chamber with an inlet and an outlet. The inlet of the first chamber may be connected to a source of the first solution. A semi-permeable membrane separates the first chamber from a second chamber. The second chamber has an inlet and first and second outlets. In some embodiments, a third chamber may receive a solvent-enriched second solution from the first outlet of the second chamber and a reagent from the second outlet of the second chamber. The third chamber may include an outlet that is connected to a separation operation, such as a filter for filtering the solvent-enriched second solution. The filter may have first and second outlets, with the first outlet connected to the inlet of the second chamber in order to recycle a precipitated solute to the second chamber. In some embodiments, a fourth chamber may receive the solvent-enriched second solution from the second outlet of the separation operation. The fourth chamber may have a heater for heating the solvent-enriched second solution. A first outlet in the fourth chamber may return constituent gases to the inlet of the second chamber. As discussed herein, various species, such as the gases from the fourth chamber and/or precipitated solute from the third chamber, may be recycled within the system. Such species may be introduced, for example to the second chamber, at the same inlet or at different inlets. A second outlet in the fourth chamber may permit a final product, e.g., the solvent, to exit the apparatus. Flow channel configurations may account for changing flow volumes or flow rates in the feed solution and draw solution as flux occurs across the membrane from one solution to the other. The flow channels for the feed and draw solutions in the membrane systems should generally be designed to be approximately equal for short lengths and low to moderate flux rates, or tapering in which feed becomes narrower and draw becomes deeper for longer channel lengths and or higher fluxes.

In accordance with one or more embodiments, a forward osmosis membrane module may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, draw solutes may be recovered for reuse. Examples of draw solute recovery processes are described in U.S. Patent Publication No. 2012/0067819 (the '819 publication), to McGinnis, the disclosure of which is hereby incorporated herein by reference in its entirety. A separation system may strip solutes from dilute draw solution to produce product water substantially free of the solutes. The separation system may include a distillation column. Draw solutes may then be returned, such as by a recycle system, back to the concentrated draw solution. Gaseous solutes may be condensed or absorbed to form a concentrated draw solution. An absorber may use dilute draw solution as an absorbent. In other embodiments, product water may be used as an absorbent, for all or a portion of the absorbing of the gas streams from a solute recycle system. In addition, gas and/or heat produced as part of the waste water treatment process may be used in the draw solute recovery process.

In accordance with one or more embodiments, the first solution may be any aqueous solution or solvent containing one or more solutes for which separation, purification or other treatment is desired. In some embodiments, the first solution may be non-potable water, such as seawater, salt water, brackish water, gray water, and some industrial water. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc. In some examples, the first solution may be brine, such as salt water or seawater, wastewater or other contaminated water. The first solution may be delivered to a forward osmosis membrane treatment system from an upstream unit operation such as industrial facility, or any other source such as the ocean. The second solution may be a draw solution containing a higher concentration of solute relative to the first solution. A wide variety of draw solutions may be used. For example, the draw solution may comprise a thermolytic salt solution. In some embodiments, an ammonia and carbon dioxide draw solution may be used, such as those disclosed in U.S. Patent Publication No. 2005/0145568, to McGinnis, the disclosure of which is hereby incorporated herein by reference in its entirety. In one embodiment, the second solution may be a concentrated solution of ammonia and carbon dioxide. In at least one embodiment, the draw solution may comprise ammonia and carbon dioxide in a molar ratio of greater than 1 to 1.

Preferred solutes for the second (draw) solution may be ammonia and carbon dioxide gases and their products, ammonium carbonate, ammonium bicarbonate, and ammonium carbamate. Ammonia and carbon dioxide, when dissolved in water at a ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering the solution comprised primarily of ammonium bicarbonate with an excess of ammonia gas so that the ratio of ammonia to carbon dioxide increases to about 1.75 to 2.0 will shift the equilibrium of the solution towards the soluble species of the solute, ammonium carbamate. The ammonia gas is more soluble in water and is preferentially adsorbed by the solution. Because ammonium carbamate is more readily adsorbed by the solvent of the second solution, its concentration can be increased to the point where the solvent cannot adsorb anymore of the solute, i.e., saturation. In some non-limiting embodiments, the concentration of solutes within this second solution achieved by this manipulation is greater than about 2 molal, more than about 6 molal, or about 6 to 12 molal.

In accordance with one or more embodiments, the ratio of ammonia to carbon dioxide should substantially allow for the full absorption of the draw solution gases into the absorbing fluid, e.g., a portion of the dilute draw solution as described above, based on the highest concentration of the draw solution in the system. The concentration, volume, and flow rate of the draw solution should generally be matched to the concentration, volume, and flow rate of the feed solution, such that the desired difference in osmotic pressure between the two solutions is maintained throughout the membrane system and range of feedwater recovery. This may be calculated in accordance with one or more embodiments taking into consideration both internal and external concentration polarization phenomena in the membrane and at its surface. In one non-limiting desalination embodiment, a concentrated draw solution inlet flow rate may be used which is approximately 33% of the saline feedwater flow rate, typically in the range of about 25% to 75% for a seawater desalination system. A lower salinity feed may require draw solution inlet rates of about 5% to 25% of the feedwater flow. The dilute draw solution outlet rate may typically be about 50% to 100% of the feedwater inlet rate, and about three to four times the volume of the brine discharge.

In accordance with one or more embodiments, the ratio of ammonia to carbon dioxide should generally be matched to the concentrations of the draw solution and the temperatures used in the draw solute removal and recovery process. If the ratios are not sufficiently high, it will not be possible to completely absorb the draw solute gases into salts for reuse in the concentrated solution, and if the ratio is too high, there will be an excess of ammonia in the draw solution that will not properly condense in a desired temperature range, such as that necessary for the use of waste heat to drive the process. For example, in some embodiments a distillation column may strip gases at about 50 degrees C. and an absorbing column may operate at about 20 degrees C. The ratio of ammonia to carbon dioxide should further be considered to prevent the passage of ammonia into the feed solution through the membrane. If the ratio is too high, this may cause unionized ammonia to be present in higher concentrations in the draw solution (normally primarily ammonium) than are necessary or desirable. Other parameters, such as feedwater type, desired osmotic pressure, desired flux, membrane type and draw solution concentration may impact the preferred draw solution molar ratio. The ratio of ammonia to carbon dioxide may be monitored and controlled in an osmotic separation process. In at least one embodiment, the draw solution may comprise ammonia and carbon dioxide in a molar ratio of greater than 1 to 1. In some non-limiting embodiments, the ratio for a draw solution at approximately 50 degrees C., and with the molarity of the draw solution specified as the molarity of the carbon dioxide within that solution, may be at least about 1.1 to 1 for up to 1 molar draw solution, about 1.2 to 1 for up to 1.5 molar draw solution, about 1.3 to 1 for up to 3 molar draw solution, about 1.4 to 1 for up to 4 molar draw solution, about 1.5 to 1 for up to 4.5 molar draw solution, about 1.6 to 1 for up to 5 molar draw solution, about 1.7 to 1 for up to 5.5 molar draw solution, about 1.8 to 1 for up to 7 molar draw solution, about 2.0 to 1 for up to 8 molar draw solution and about 2.2 to 1 for up to 10 molar draw solution. Experiments indicate that these are approximately the minimum ratios needed for stable solubility of solutions of these concentrations at this approximate temperature. At lower temperatures, higher ratios of ammonia to carbon dioxide are required for the same concentrations. At higher temperatures, lower ratios may be required, but some pressurization of the solution may also be required to prevent decomposition of the solutes into gases. Ratios greater than 1 to 1, even at overall concentrations of less than 2 molar greatly increase the stability of the solutions and prevent evolution of carbon dioxide gas and in general thermolytic splitting of the draw solutions in response to even moderate amounts of heat and or reduction of pressure.

In accordance with one or more embodiments, a forward osmosis separation process may comprise introducing a first solution on a first side of a semi-permeable membrane, detecting at least one characteristic of the first solution, selecting a molar ratio for a concentrated draw solution comprising ammonia and carbon dioxide based on the at least one detected characteristic, introducing the concentrated draw solution comprising ammonia and carbon dioxide at the selected molar ratio on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain the selected concentrations and molar ratio of ammonia to carbon dioxide in the concentrated draw solution, and collecting the solvent stream.

In accordance with one or more embodiments, an apparatus for osmotic extraction of a solvent from a first solution may comprise a first chamber having an inlet fluidly connected to a source of the first solution, a second chamber having an inlet fluidly connected to a source of a concentrated draw solution comprising ammonia and carbon dioxide in a molar ratio of at least 1 to 1, a semi-permeable membrane separating the first chamber from the second chamber, a separation system fluidly connected downstream of the second chamber including a distillation column, the separation system configured to receive a dilute draw solution from the second chamber and to recover draw solutes and a solvent stream, and a recycle system including an absorber configured to facilitate reintroducing the draw solutes to the second chamber to maintain the molar ratio of ammonia to carbon dioxide in the concentrated draw solution.

In accordance with one or more embodiments, various osmotically driven membrane systems and methods may be integrated with larger systems. In some embodiments, systems and methods may be integrated with various heat sources and water systems. In at least one embodiment, a draw solution may be fed on the inside of tubes associated with a condenser. In some embodiments, hot water from below-ground may be used in a reboiler. In other embodiments, geothermal heat, waste heat from industrial sources, solar collectors, molten salt, or residual heat in a thermal storage system may be used. In still other embodiments, diesel generators may be implemented.

In accordance with one or more additional embodiments, forward osmosis systems and methods may be integrated with auxiliary processes for maximizing water recovery from wastewater sources with potential for scale precipitation. For example, to prevent precipitation of calcium and magnesium salts, calcium and magnesium may first be removed from the feed via techniques such as those involving ion exchange with sodium on strong acid cation exchange resin. The FO concentrate may be used for regenerating the resin. A chemical dispersant may be used to prevent precipitation within the ion exchange column. For silica scale control, a silica scale dispersant may be fed to the feed of the system. If the desired concentration factor leads to a concentration of silica that exceeds the maximum recommended by the dispersant supplier, a portion of the feed may be recycled through a small external microfilter or ultrafilter that removes silica.

In another embodiment, soluble salts may be concentrated in the FO membrane system to or beyond their solubility, with our without the use of anti-scalant chemicals, such that the concentrated feed solution is directed to a precipitation tank containing seed crystals and/or flocculant chemical addition. This solution may then be directed to a settling tank and/or to a filtration device to remove particulates. The effluent from this treatment may then be directed to another process, disposed of, or recirculated in the FO membrane system for further concentration. The use of fluid shear forces and/or the introduction of air bubbles for scouring may be used in the FO membrane system to ensure that precipitation and/or fouling does not occur on the membrane surface.

In accordance with one or more embodiments, membrane fouling may be monitored and controlled. Membrane fouling may be controlled using scouring techniques such as those involving liquid turbulence and gas introduction. In some embodiments, shear forces, such as those involving fluid dynamics in circulation inducing shear at a membrane surface, may be used for scouring. In other embodiments, objects such as foam balls may be placed in flow paths to effect scouring. In some embodiments, fouling and biological activity may be controlled through manipulation of operational parameters to alter osmotic pressure and flow paths, for example, such that different membrane areas experience different solutions, osmotic pressures, pH, or other conditions at different times. Variations over time, such as based on minutes, hours, or years, may be scheduled. Additional FO separation systems and methods may be used to treat solutions with high scaling potential. These systems and methods will allow for significantly higher recoveries of feedwater streams, offering significant economic and environmental benefits (e.g., less intake water, less discharge water, less chemical use, etc.) by using either supersaturation and desaturation or a seeded slurry.

Non-seeded slurry systems send a saturated solution to the membrane array, the feed of which would become supersaturated by removal of water through flux. This supersaturated solution would be directed to a tank mixing this solution with suspended crystals or other nucleation points for precipitation. The slurry would then be directed to a settling tank, hydrocyclone, or other filtration device to remove precipitates.

Systems and methods using a seeded slurry will have precipitates suspended in solution throughout the membrane module, such that additional precipitation will occur on these nucleation points, rather than on the membrane surface, as described in greater detail below with respect to FIG. 2. Handling of the slurry would require a pre-filtration or hydrocyclone system to maintain a maximum particle diameter. In various embodiments, the membrane of this system may be coated and in some cases periodically recoated to prevent abrasion of the barrier layer. Such coatings may include polyvinyl acetate (PVA). Additional advantages of these systems and methods include, for example, their ability to allow continuous desalination of solutions at or above their solubility limits for one to many salts, reducing or eliminating the use of chemicals to be consumed by the process, reducing membrane fouling, and reducing the effect of reverse salt transport.

In accordance with one or more embodiments, systems and methods may be used in membrane bioreactor (MBR) operations for wastewater treatment. In some embodiments, wastewater may be converted for reuse from waste in a single step. Some embodiments may not require aeration such that direct membrane separation of water from suspended solids and organics in a waste stream, or a membrane digester operation, may provide savings in terms of energy and overall cost. In non-limiting embodiments, an MBR system may be designed such that circulation is along the surface of the membrane sheets, with a relatively unmixed region in the tank below the sheets. Solids may be removed from this settling zone. Fermentation may take place in the unmixed region as well, allowing for the removal and use of methane from the top of the tank. The tank may be configured such that pump outlets are placed on one side of the tank directing flow along the transverse (width) axis of the membrane sheets inducing shear force and turbulence if desired such that flow is evenly distributed along the longitudinal axis of the sheets, evenly distributed from top to bottom. The shear forces, along with, for example, aeration and agitation, help prevent/reduce fouling of the membrane surfaces. The tank may further be configured so that the opposite wall of the tank is curved in such a way as to return water with reduced resistance back to the pump side of the tank, with this flow passing on either side of the membrane stack. Draw solution in the interior of the membrane pockets may flow from top to bottom, bottom to top, or alternate in series as needed. Membrane stacks may be arranged such that different regions of the tank experience different steady state concentrations of feed solution. Air bubbles may be used to scour the membrane surface to reduce concentration polarization phenomena and to prevent fouling and/or scaling on the membrane surface, with this air introduction being intended for these purposes rather than for the introduction of oxygen to the solution, as would be typical of conventional membrane bioreactors.

In accordance with one or more embodiments, membrane bioreactors and conventional reverse osmosis processes may be replaced with the forward osmosis techniques disclosed herein for the treatment of industrial wastewater. A forward osmosis approach may be particularly beneficial in applications involving high levels of suspended solids or high levels of dissolved organics. Forward osmosis may also be a desirable option for the treatment of wastewater having a high biochemical oxygen demand (BOD) or a high chemical oxygen demand (COD). Forward osmosis performs the same function as MBR and reverse osmosis, but in a single step and without the energy normally required by MBR to aerate the water to introduce oxygen for biological degradation of the BOD and COD. Specifically, the use of forward osmosis for concentrating sewage eliminates the need for air/oxygen to get the necessary bacteria to consume the waste, resulting in a more efficient process—less equipment, less energy, and a smaller footprint. The concentrated sewage can then be sent to, for example, a digester to produce methane gas, as discussed below.

In accordance with one or more embodiments, forward osmosis may also be used to concentrate a feed stream. Forward osmosis concentration processes may produce potable or other high quality water in a single step process, in contrast to conventional microfiltration or ultrafiltration processes, which require post-polishing stages, such as those involving reverse osmosis, i.e., FO-MBR produces water of the same quality as conventional MBR followed by a reverse osmosis process, but in a single step.

In some embodiments, a process stream may contain desired target species to be concentrated and recovered, such as a pharmaceutical, salt, enzyme, protein, catalyst, microorganism, organic compound, inorganic compound, chemical precursor, chemical product, colloid, food product, or contaminant. In at least one embodiment, forward osmosis may be used for mineral recovery. In some embodiments, forward osmosis may be used to concentrate brines in the solution mining industry. Brine solutions may reach saturation with a forward osmosis operation such that precipitation may facilitate recovery of minerals, salts, metals, and fertilizers, such as potash.

Streams having high BOD and/or high COD may be concentrated using a forward osmosis process. In some embodiments, forward osmosis concentration processes may be coupled to an anaerobic digester to produce gas for combustion. The gas produced may also provide heat to a solute recovery process without a separate digester. In other embodiments, forward osmosis concentration processes may be coupled to an incinerator for direct combustion of solids to provide heat to an upstream forward osmosis process and/or solute recovery process.

FIG. 1 presents a schematic of a forward osmosis system/process for wastewater treatment. A wastewater stream to be treated may contain one or more species such as salts, proteins, catalysts, microorganisms, organic or inorganic chemicals, chemical precursors or products, colloids, or other constituents. In some non-limiting embodiments, nutrient discharge by wastewater plants may be reduced with a forward osmosis system and process as illustrated.

As shown in FIG. 1, the system/process 10 includes a forward osmosis module 12. Various forward osmosis systems and processes can be used, such as those described herein and further described in U.S. Pat. No. 6,391,205, U.S. Patent Publication No. 2011/0203994; and PCT Application Serial Nos. PCT/US10/054738, filed Oct. 29, 2010, and PCT/US10/054512, filed Oct. 28, 2010, the disclosures of which are hereby incorporated herein by reference in their entireties. The module 12 is in fluid communication with a wastewater source or stream 14 (i.e., the feed solution) and a draw solution source or stream 16. The wastewater source 14 can include, for example, municipal (e.g., sewage) and/or industrial (e.g., hydraulic fracturing flowback) wastewater, including radioactive water. The draw solution source 16 can include, for example, a saline stream, such as sea water, or another solution as described herein that can act as an osmotic agent to dewater the wastewater source 14 by osmosis through a forward osmosis membrane within the module 12. The module 12 outputs a stream 18 of concentrated solution from the wastewater source 14 that can be further processed as described herein. The module 12 also outputs a dilute draw solution 20 that can be further processed as described herein, for example, the dilute draw solution 20 can be directed to a separation unit 22 where draw solutes and a target solvent can be recovered.

Figure 2:
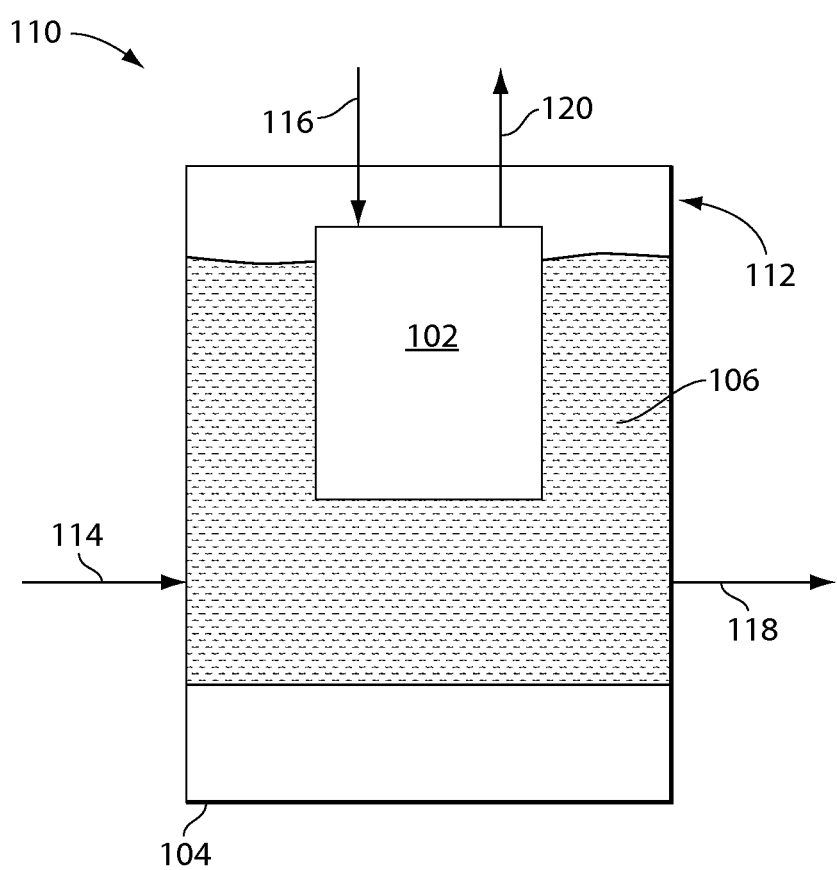
FIG. 2 is a schematic representation of an alternative system/process for the treatment of wastewater in accordance with one or more embodiments of the invention.

FIG. 2 depicts a system/process 110, where a forward osmosis membrane module 102 may be immersed or placed within an enclosed assembly. In addition to the methods described above for reducing fouling, the system/process 110 depicted in FIG. 2 utilizes a seeded slurry approach for treating a source of wastewater or other feed solution. As shown, the system/process 110 includes a forward osmosis module 112 in fluid communication with a wastewater stream 114 and a draw solution stream 116. The module 112 includes a chamber or tank 104 for receiving the wastewater. The chamber 104 is configured for holding the membrane module 102. As discussed with respect to FIG. 1, the FO module 112 also outputs a concentrated solution 118 and a dilute draw solution 120.

In accordance with one or more embodiments, seeds are added to the chamber 104 to create a seeded slurry 106. The seeds provide nucleation points for the selective precipitation of certain solutes (e.g., a salt or amino acid) thereon. The targeted solutes will precipitate out of the seeded slurry 106 and settle to the bottom of the chamber 104, as opposed to being deposited on the membrane surface, where the precipitated solutes can be further processed as previously discussed. These may be partially reused in the process, for example with precipitated solids redirected to the tank as seeds. In addition, the chamber 104 can include additional means for improving the forward osmosis process, for example, aeration and agitation to reduce membrane fouling and/or improve the effectiveness of the seeds, as previously disclosed.

The use of seeds in the forward osmosis module is particularly beneficial for feeds that may require pretreating or contain desirable solutes, for example, a feed from a pharmaceutical process. The seeds assist in the recovery of the target solutes. Furthermore, with respect to the treatment of wastewater having a high level of suspended solids, a portion of the solids can be drawn off of the bottom of the chamber 104 and another portion can be precipitated out by the use of the seeds. In addition, the size and composition of the seeds can be selected to suit a particular application, such as, for example, recovery of a pharmaceutical compound or reducing the effect of reverse salt transport.

Figure 3:
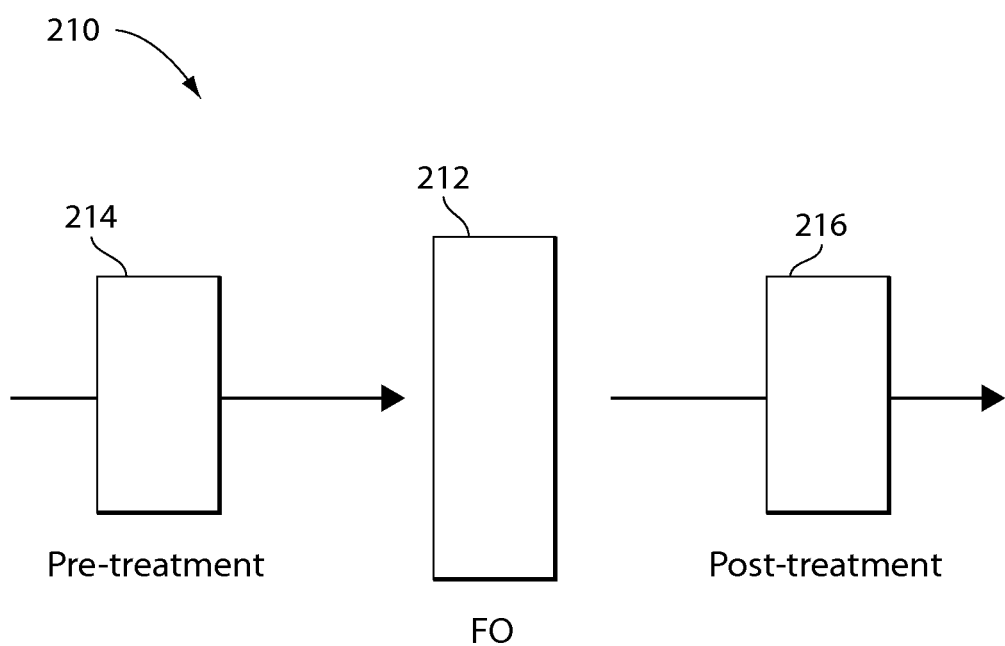
FIG. 3 is a schematic diagram of a system for osmotic extraction of a solvent in accordance with one or more embodiments of the invention.

FIG. 3 presents a schematic of a system 210 for osmotic extraction of a solvent using a forward osmosis system/process 212 including one or more pretreatment and/or post-treatment unit operations 214, 216. Various forward osmosis systems and processes can be used, such as those described herein and further described in U.S. Pat. No. 6,391,205, U.S. Patent Publication No. 2011/0203994; and PCT Publication Nos. WO2011/053794 and WO2011/059751, referenced above.

In accordance with one or more embodiments, the system 210 may include one or more pretreatment operations 214 to enhance the forward osmosis process 212. Pretreatment may involve pH adjustment, such as elevating pH levels of a process stream to be treated, use of an anti-scalant, various types of filtration, polymer addition, heat exchange, softening, and nanofiltration softening.

In accordance with one or more embodiments, the system 210 may include one or more post-treatment operations 216. Post-treatment may involve second pass reverse osmosis separation, ion exchange separation, additional forward osmosis processes, or other ammonia and/or salt removal operations. Post-treatment may reduce product water salinity below that produced by a single pass forward osmosis system. In other embodiments, post-treatment may alternatively or additionally be used to remove draw solutes that would otherwise be present in a product stream. In some specific non-limiting embodiments, forward osmosis brine discharge may be post-treated using ion exchange, distillation, pervaporation, membrane distillation, aeration, biological treatment or other process to remove draw solutes that reverse diffuse into brine. Additional post-treatment operations can include zero liquid discharge (ZLD) treatment using, for example, crystallization and evaporation. In one embodiment, the ZLD treatment uses a forward osmosis system, for example, in place of an evaporation system.

In accordance with one or more embodiments, feedwater may be preheated with reject heat from a draw solute recovery process for improved flux. Examples of draw solute recovery processes are described in the '819 publication referenced above. A draw solute recovery system may require cooling. For example, a condenser of a stripper may require cooling. Cooling may thus be provided by a membrane feed stream prior to its introduction to the forward osmosis membrane. The membrane feed stream may provide sufficient cooling to allow for reabsorption of the draw solute stream during the draw solute recovery process. In one embodiment, the feed stream may cool one or more streams in the recovery process to ambient. Additionally, higher membrane system temperatures may be associated with higher flux by increasing water permeability, increasing draw and/or feed solute diffusivity, and improving membrane pore structure by thermal expansion.

In accordance with one or more embodiments, brine may be used to remove heat from a draw solute recovery process. Heating the brine may vaporize residual solutes in the brine. Specifically, brine concentrate from forward osmosis membranes may be directed to a condenser at the top of a stripper to provide cooling for the latter. Heat absorbed by the brine may help drive dissolved gas from the brine and may be used in a stripping process as brine post-treatment, similar to that used for draw solute recycling from the product water stream. For example, draw solutes that have entered the brine stream via reverse salt flux in the membrane system can be recovered by heating the brine; in some embodiments in conjunction with the other processes disclosed in, for example, the '819 publication. In either case, the draw solutes may be returned to the concentrated draw solution and reused.

In accordance with one or more embodiments, activated charcoal or other organics may be used to absorb or filter a gas stream from the dilute draw solution stripping system and/or a brine post-treatment system. The absorption operation may remove volatile components of the treated streams that would otherwise accumulate in the draw solution system. For example, soluble organic compounds that pass through a forward osmosis membrane may be volatilized in the solute recovery system. A similar system may be used in the case of any component of the stream to be stripped of draw solutes that contains non-draw solute volatile components. Any appropriate separation operation to prevent accumulation of volatile compounds should be used on the vapor stream from the stripping system. For example, separation may be provided prior to stripping in the liquid phase, prior to condensation in the vapor phase, after condensation in the liquid phase, or within the draw solution system at any point where accumulation of these compounds would be prevented by its use. In one embodiment, the draw solution vapor and liquid streams would be cooled and in contact with one another for a time period sufficient to allow for substantially full reabsorption of the draw solutes, which can be done in a packed tower or membrane system.

In accordance with one or more embodiments, water softening by ion exchange, nanofiltration, or similar process may be implemented as a pretreatment for a forward osmosis process. In some specific embodiments, softening may be provided prior to zero liquid discharge water treatment to ensure that product salt is of high value. The purity of the salt and its composition, such as high purity sodium chloride, may be selected by operation of pretreatment softening, as the softening process can selectively remove divalent ions. Thus, an integrated system may yield a high value product. Brine following forward osmosis treatment may be used for ion exchange recharge. In other embodiments, any type of crystallizer may be used to produce salt following forward osmosis separation.

Figure 4:
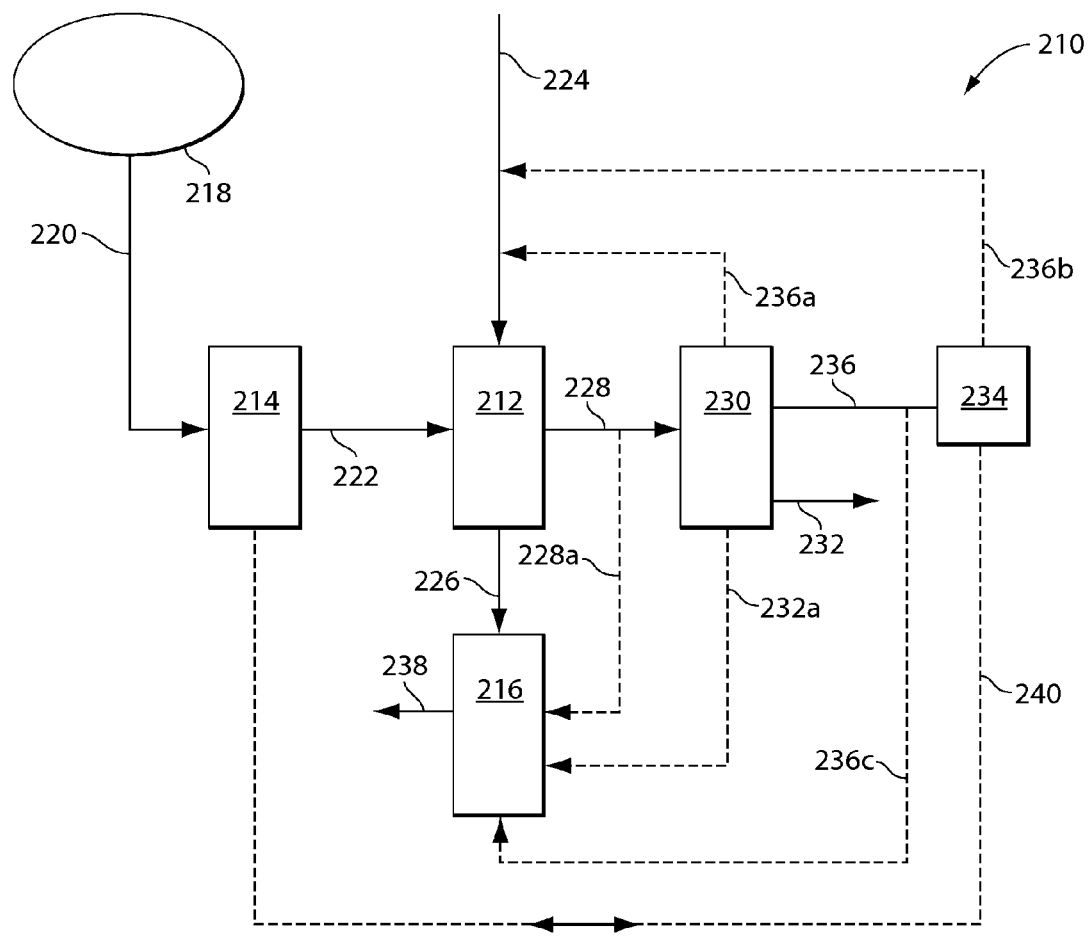
FIG. 4 is schematic representation of one application of the system of FIG. 3 in accordance with one or more embodiments of the invention.

FIG. 4 represents one possible application of the system 210 for osmotic extraction of a solvent in accordance with one or more embodiments of the invention. As discussed with respect to FIG. 3, the system 210 includes the forward osmosis system 212 and one or more pre- and post-treatment units 214, 216. The system 210 can include any combination of pre- and/or post-treatment units 214, 216 in conjunction with one or more forward osmosis systems 212, including only pretreatment or only post-treatment. The various systems/units described herein may be interconnected via conventional plumbing techniques and can include any number and combination of components, such as pumps, valves, sensors, gauges, etc., to monitor and control the operation of the various systems and processes described herein. The various components can be used in conjunction with a controller as described herein.

In the application shown in FIG. 4, the system 210 is used to treat brackish water from an inland source 218. As shown, a feed stream 220 is directed to the pretreatment unit 214, where the feed stream is, for example, heated. Once the feed stream has been pretreated, the treated stream 222 is then directed to the forward osmosis system 212, where it provides the first solution as discussed herein. Optionally, the treated stream 222 could be directed to additional pretreatment units for further processing (e.g., pH adjustment) before entering the forward osmosis system 212. A draw solution is provided to the forward osmosis system 212 via stream 224 to provide the osmotic pressure gradient necessary to promote transport of the solvent across the membrane, as discussed herein.

At least two streams exit the forward osmosis system 212: a concentrated feed or treated stream 226, from which solvent has been extracted; and a dilute draw stream 228, to which solvent has been added. The concentrated stream 226 can then be directed to a post-treatment unit 216 for further processing, such as a second forward osmosis system to recover additional solvent. Additional post-treatment processes may be utilized, for example, crystallization and evaporation, to further provide for zero liquid discharge. The fully processed or concentrated feed can be disposed of, recycled, or otherwise reclaimed depending on the nature of the concentrate (arrow 238).

The dilute draw stream 228 can be directed to a separation system 230, where the solvent and/or draw solutes can be recovered. Optionally, the dilute draw stream 228 can also be directed to a post-treatment unit as desired for additional processing (stream 228a). In one or more embodiments, the separation system 230 separates the draw solutes from the dilute draw stream 228 to produce a substantially purified solvent stream 232, for example, potable water, and a draw solute stream 236. In one or more embodiments, the solvent stream 232 can also be directed to a post-treatment unit for further processing (stream 232a) depending on the end use of the solvent. For example, the solvent can be further treated via distillation to remove additional draw solutes that may still be present in the solvent. In one or more embodiments, the draw solute stream 236 can be returned directly to the draw stream 224 (stream 236a), directed to a recycling system 234 for reintegration into the draw stream 224 (stream 236b), or directed to a post-treatment unit (stream 236c) for further processing depending on the intended use of the recovered draw solutes. In one or more embodiments, the recycling system 234 can be used in conjunction with the pretreatment unit 214 to, for example, provide heat exchange with the feed stream 220 (stream 240).

Figure 5:
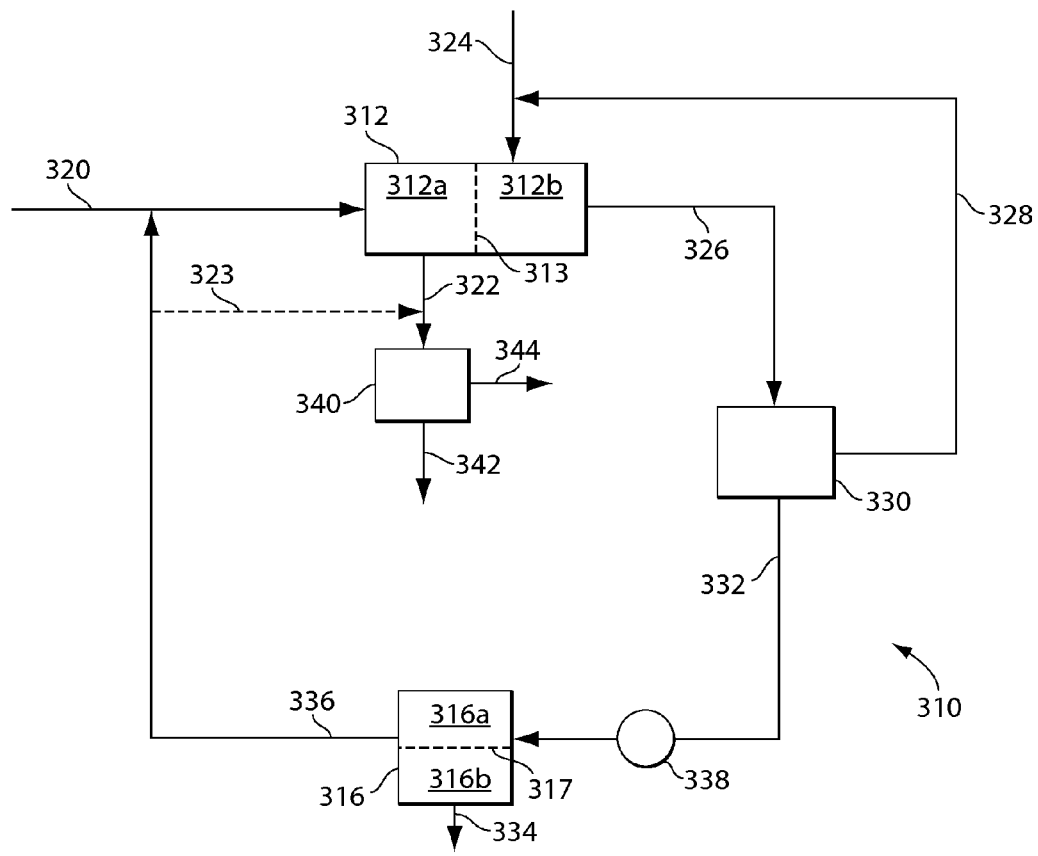
FIG. 5 is a schematic representation of an osmotic system including a forward osmosis unit and a reverse osmosis unit in accordance with one or more embodiments of the invention.

FIG. 5 represents an osmotically driven membrane system 310 that is configured to adjust the ion balance of the overall system and recover additional draw solutes from a forward osmosis system by using a reverse osmosis unit to post-treat the purified water discharged by a separation/recycling unit and redirecting the concentrate from the reverse osmosis system to a feed of the forward osmosis system. This arrangement allows for the recovery of additional draw solutes and maintains the ion balance of the overall system without the need for the addition and/or removal of certain chemicals or additional systems/processes (e.g., ion exchangers).

As shown in FIG. 5 (and similar to the system 210 shown in FIG. 4), the system 310 includes the forward osmosis unit 312, which includes one or more first chambers 312a that contain or are in fluid communication with a source of a feed or first solution 320. The forward osmosis unit 312 also includes one or more second chambers 312b that are separated from the first chamber(s) 312a by a semi-permeable forward osmosis membrane 313. The second chamber(s) 312b either contain or are in fluid communication with a source of concentrated draw solution 324. The concentrated draw solution 324 has a solute concentration sufficient to maintain an osmotic concentration gradient across the membrane 313, thereby causing a solvent from the first/feed solution 320 to flux across the membrane 313 into the second chamber 312b and dilute the concentrated draw solution. The first solution 320 is concentrated in the first chamber 312a, forming a second solution 322.

During the forward osmosis process, ion exchange can occur across the membrane 313. In an exemplary system using a $NH_3$—$CO_2$ draw solution with a feed solution containing NaCl, ammonium ions ($NH_4^+$) may move from the second chamber/side 312b of the forward osmosis membrane 313 to the first chamber/side 312a of the membrane 313 and sodium ions ($Na^+$) may move from the first chamber/side 312a of the membrane 313 to the second chamber/side 312b of the membrane 313. This ion exchange results in the second solution 322 containing at least one first ionic species of solute (e.g., $NH_4^+$) and the dilute draw solution 326 containing at least one second ionic species of solute (e.g., Na+). The negative impact of the ion exchange can result in a loss of recoverable draw solutes and higher salinity product water. The novel use of a reverse osmosis system and an additional separation system as described below overcome the negative impacts of the ion exchange phenomena and provide an unexpected improvement to draw solute recovery, in addition to improving the product water quality.

The dilute draw solution 326 is directed to a separation and/or recycling system 330, where the dilute draw solution 326 is separated into draw solutes (or a concentrated draw solution) 328 and the solvent (e.g., potable water) obtained via the forward osmosis process. This recovered solvent 332 contains the at least one second ionic species of solute that exchanged through the membrane, but was not removed during the draw solute recovery operation. The draw solutes can be recovered via any of the systems and methods described herein, including in the '819 publication. The recovered draw solutes 328 can be recycled into the source of concentrated draw solution 324 or form the basis thereof.

Because of the ion exchange phenomena, not all of the draw solutes are recoverable during this initial separation/recycling process. For example, where one ionic species (e.g., $NH_4^+$) reverse ion exchanged through the membrane and another ionic species of solutes (Na+) entered the draw solution, the ratio of draw solutes in the dilute draw solution is unbalanced. The equilibrium of the draw solutes (e.g., ammonia ($NH_3$) and carbon dioxide ($CO_2$)) need to be balanced to most effectively remove all of the draw solutes from the dilute draw solution. Accordingly, the at least one second ionic species of solute may include an ionic species of draw solute that remains present in the recovered solvent (e.g., a carbonate). In the exemplary embodiment, the loss of ammonia ions results in excess carbonate ions remaining present in the solvent. In this embodiment, the at least one second ionic species of solutes present in the recovered solvent will include the sodium ions (Na+) and carbonate ions ($CO_{3-}$) in solution.

In one or more embodiments, the separation/recycling system 330 uses waste heat to remove the ammonia and carbon dioxide solutes from the dilute draw solution. As previously discussed, because ammonium ions reverse exchanged through the forward osmosis membrane 313, the ammonia to carbon dioxide ratio is altered and there is not a sufficient amount of ammonia in the dilute draw solution to remove all of the carbon dioxide, some of which is present in the form of a carbonate. The $NH_3CO_2$ that is present in the dilute draw solution in the required ratio is vaporized out of the solution, leaving the solvent and the sodium ions and carbonate ions (i.e., the at least one second ionic species of solute) in solution with the recovered solvent.

The recovered solvent 332 containing the at least one second ionic species of solute, which might normally be considered a final product, is directed to a reverse osmosis system 316. Typically, the solvent 332 will be pressurized and transferred to the reverse osmosis system 316 via a pressure exchange device, such as a pump 338. The solvent 332 is transferred to a first chamber/side 316a of the reverse osmosis system 316 under pressure, thereby forcing solvent through the reverse osmosis membrane 317 and resulting in a purified solvent 334 on the second chamber/side 316b of the membrane 317. The purified solvent 334 can be collected for any intended purpose. Remaining under pressure in the first chamber/side 316a of the membrane 317 is the concentrated solution containing the at least one second ionic species of solute, which is unable to pass through the membrane 317. This concentrated solution 336 is then directed to the forward osmosis system 312. In particular, the concentrated solution 336 is added to the feed/first solution 320 and introduced therewith to the first chamber/side 312a of the system 312/ membrane 313. The introduction of the concentrated solution 336 results in the second solution containing both the at least one first and the at least one second ionic species of solutes (e.g., $Na^+$, $NH_4^+$, and $CO_{3-}$). In alternative embodiments, the concentrated solution 336 is not returned directly to the forward osmosis unit 312/first solution 320, but is transferred directly to the second separation system 340, as shown by dashed line 323, in which case the concentrated solution 336 is mixed with the second solution or brine concentrate. This may be particularly beneficial in cases where the concentrated solution 336 has greater TDS, which can negatively impact operation of the forward osmosis unit 312 by, for example, decreasing the osmotic pressure in the system.

The first and second ionic species of solutes in the second solution 322 are balanced, thereby resulting in the formation of ammonium carbonate and/or ammonium bicarbonate and/or ammonium carbamate (i.e., additional removable draw solutes). The second solution 322 is directed to a second separation/recycling system 340. In some embodiments, the system 340 is used to concentrate/separate out the brine. The separation/recycling system 340 works similarly to the first separation/recycling system 330 and separates out the newly formed additional draw solutes 344. These draw solutes 344 can be recycled back to the concentrated draw solution source 324. The balanced ratio of ammonia ions and carbonate ions allows for virtually all of the draw solutes being removed and recovered from the second solution. The remaining second solution (e.g., brine) 342 can be further processed or otherwise disposed of.

Figure 6:
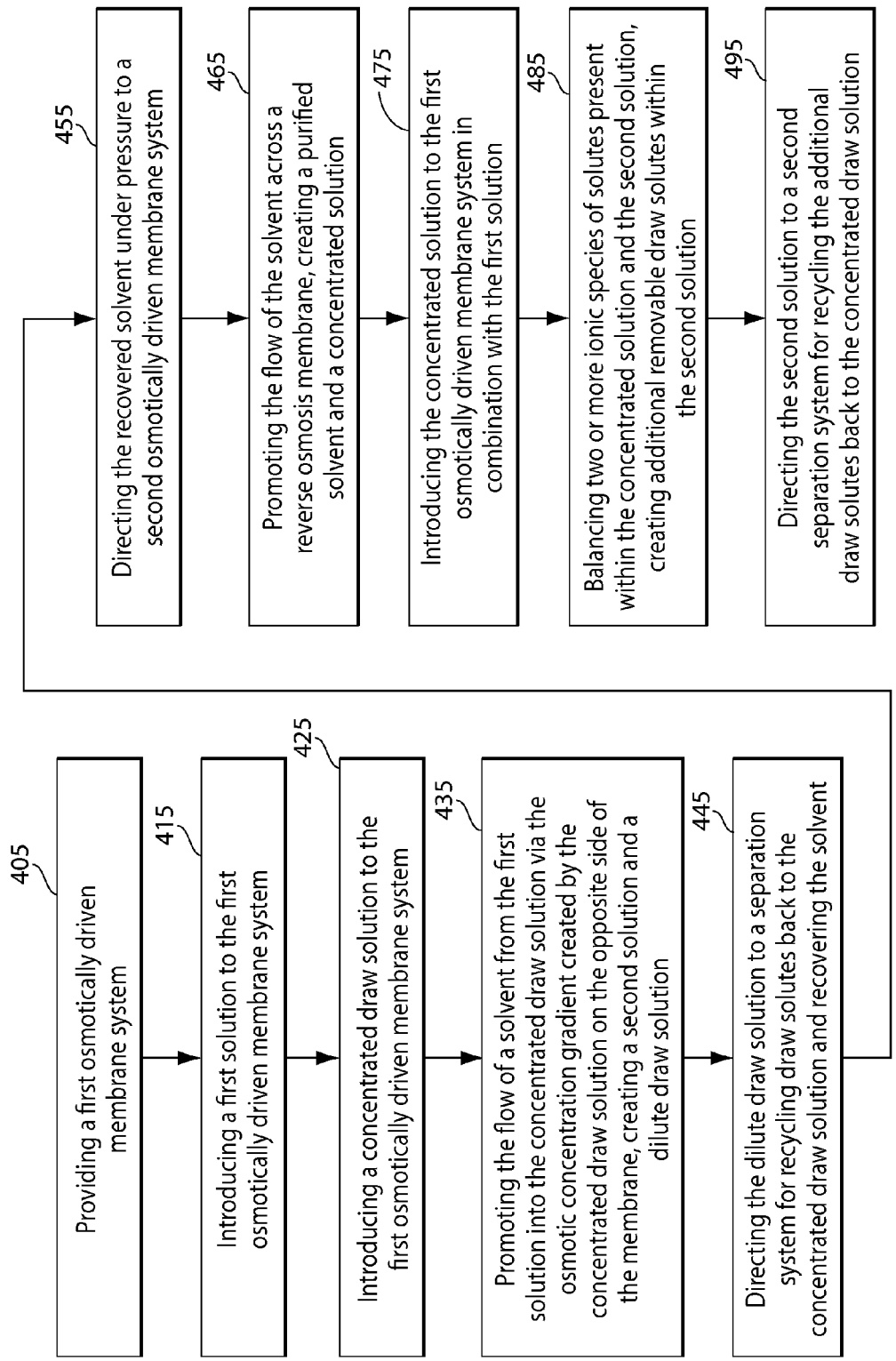
FIG. 6 is a flow chart depicting the various steps of an osmotically driven membrane process configured for maintaining the ion balance thereof.

FIG. 6 is a flow chart generally depicting the operation of the various osmotically driven membrane systems configured to maintain the ion balance of the overall system and maximize recovery of draw solutes. As shown in FIG. 6, the process begins with providing a first osmotically driven membrane system (Step 405) in the form of a forward osmosis system. A first solution and a concentrated draw solution are introduced to opposite sides of a forward osmosis membrane within the first system (Steps 415, 425). The process further includes the step of promoting the flow of a solvent from the first solution into the concentrated draw solution (Step 435). This step results in the formation of a second solution on one side of the membrane and a dilute draw solution on the opposite side of the membrane. Due to the ion exchange phenomena, the second solution will include a first ionic species of solute that reverse exchanged through the membrane and the dilute draw solution will include a second ionic species of solute that forward exchanged through the membrane.

One of the next steps in the process includes directing the dilute draw solution to a first separation/recycling system (Step 445), where the draw solutes are recovered and recycled back to the concentrated draw solution. Generally, because of the loss of the first ionic species of draw solute from the concentrated draw solution, there is an imbalance of draw solutes within the dilute draw solution, which impedes/prevents the recovery of all draw solutes from the dilute draw solution. Specifically, an excess of at least one draw solute will remain in the recovered solvent as an ionic species of draw solute, which is included in the at least one second ionic species of solute. In the exemplary system, the at least one second ionic species of solute will include the sodium ions and the carbonate ions.

The remaining solvent that is recovered in the first separation system is then directed under pressure to a second osmotically driven membrane system (Step 455) in the form of a reverse osmosis system. The flow of solvent across the reverse osmosis membrane is promoted, resulting in a purified solvent on one side of the membrane and a concentrated solution on the opposite side of the membrane (Step 465). The purified solvent can be collected for use (e.g., as potable water) or otherwise further processed. The concentrated solution, which contains the at least one second ionic species of solute, is directed to the first osmotically driven membrane system, where it is combined with the first solution and introduced to the first osmotically driven membrane system (Step 475).

The at least one second ionic species of solute (e.g., $Na^+$ and $CO_3^-$) will balance with the at least one first ionic species of solute ($NH_4^+$) present in the second solution (Step 485), thereby resulting in the formation of additional removable draw solutes. The second solution can be removed from the first osmotically driven membrane system and directed to a second separation/recycling system (Step 495), where the additional draw solutes can be removed and recycled to the concentrated draw solution. The remaining concentrated second solution (e.g., brine) can be further processed or otherwise disposed of.

In accordance with one or more embodiments, the devices, systems and methods described herein may generally include a controller for adjusting or regulating at least one operating parameter of the device or a component of the systems, such as, but not limited to, actuating valves and pumps, as well as adjusting a property or characteristic of one or more fluid flow streams through a forward osmosis membrane module. A controller may be in electronic communication with at least one sensor configured to detect at least one operational parameter of the system, such as a concentration, flow rate, pH level, or temperature. The controller may be generally configured to generate a control signal to adjust one or more operational parameters in response to a signal generated by a sensor. For example, the controller can be configured to receive a representation of a condition, property, or state of any stream, component, or subsystem of the osmotically driven membrane systems and associated pre- and post-treatment systems. The controller typically includes an algorithm that facilitates generation of at least one output signal which is typically based on one or more of any of the representation and a target or desired value such as a set point. In accordance with one or more particular aspects, the controller can be configured to receive a representation of any measured property of any stream, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature and pressure may be monitored. Membrane leaks may be detected using ion selective probes, pH meters, tank levels, and stream flow rates. Leaks may also be detected by pressurizing a draw solution side of a membrane with gas and using ultrasonic detectors and/or visual observation of leaks at a feedwater side. Other operational parameters and maintenance issues may be monitored. Various process efficiencies may be monitored, such as by measuring product water flow rate and quality, heat flow and electrical energy consumption. Cleaning protocols for biological fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier Transform Infrared Spectrometry (FTIR), or other means of sensing draw solute concentrations. A draw solution condition may be monitored and tracked for makeup addition and/or replacement of solutes. Likewise, product water quality may be monitored by conventional means or with a probe such as an ammonium or ammonia probe. FTIR may be implemented to detect species present providing information which may be useful, for example, to ensure proper plant operation, and for identifying behavior such as membrane ion exchange effects.

Forward osmosis may be paired with scale prevention pre-treatments to allow high feedwater recovery including, for example, ion exchange, chemical softening, nano-filtration, anti-scalants, and/or precipitation techniques. Air scouring in a scaling prevention system for FO may be used to prevent scaling on a membrane surface. Forward osmosis may be used for organic containing waters without aeration for biological activity. A waste stream may be concentrated for potential use in a digester, while potentially producing methane within the membrane tank for energy use, and producing a product water of reuse quality. This may be particularly effective in an immersed membrane tank design. In addition to providing oxygen, air scouring may also be used to permit a high concentration of organics without membrane fouling.

A batch or continuous stir tank reactor (CSTR) type operation may be implemented with forward osmosis, particularly to allow for enhanced function of organics concentrating forward osmosis and/or precipitating systems. Pressure retarded osmosis systems may also be in an immersed tank configuration. Pressure retarded osmosis systems may be aerated to prevent fouling and/or scaling and to reduce concentration polarization. Reactive gases may also assist in this functionality. Biological growth in forward osmosis systems may be controlled by alternating which membrane modules or sections of an array are exposed to high or low osmotic pressures. For example, a membrane array section which normally sees 0.5 M waters may be changed to the treatment of 2M waters. Such adjustment will make biofilm growth very difficult. Degassing of the feed stream may also be performed to prevent growth of certain types of biological organisms. For example, removing oxygen may restrict growth of nitrifying organisms that might oxidize ammonia passing from draw solution to feed solution. Sulphite reduction, biological treatment, osmotic shocks, conventional cleaning techniques which do not react with draw solution, product water flux without chemicals, brine solution aeration, and bisulfite addition are other techniques which may be implemented to restrict biological activity. In some embodiments, pH, ion probe, FTIR, and/or flow rates may be used to control forward osmosis systems to ensure desired fluxes, osmotic pressure differences, ratios of ammonia to carbon dioxide, and concentrations.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A method of maximizing draw solute recovery in an osmotically driven membrane system, the method comprising the steps of:
   providing a first osmotically driven membrane system comprising a forward osmosis membrane, the system configured for receiving a first solution comprising a solvent on a first side of the membrane and a concentrated draw solution on a second side of the membrane;
   osmotically separating the solvent from the first solution with the concentrated draw solution via an osmotic concentration gradient across the membrane, thereby forming a second solution on the first side of the membrane and a dilute draw solution on the second side of the membrane, wherein the second solution comprises at least one first ionic species of solute via reverse ion exchange through the membrane;
   recovering at least one draw solute and the solvent from the dilute draw solution, wherein the recovered solvent comprises at least one second ionic species of solute;
   recycling the recovered at least one draw solute to the first osmotically driven membrane system;
   providing a second osmotically driven membrane system comprising a reverse osmosis membrane;
   pressurizing the recovered solvent in the second osmotically driven membrane system to recover a substantially pure solvent and a concentrated solution comprising the at least one second ionic species of solute;
   recycling the concentrated solution comprising the at least one second ionic species of solute to the first osmotically driven membrane system, wherein the concentrated solution is added to the first solution, thereby resulting in the second solution comprising the at least one first ionic species of solute and the at least one second ionic species of solute;
   ionically balancing the at least one first species of solute with the at least one second species of solute to form additional removable draw solutes; and
   recovering the additional draw solutes and a third solution from the second solution.

2. The method of claim 1 further comprising the step of recycling the additional draw solutes into the concentrated draw solution.

3. The method of claim 1, wherein the step of recovering at least one draw solute and the solvent from the dilute draw solution comprises distillation.

4. The method of claim 1, wherein the concentrated draw solution comprises ammonia and carbon dioxide in a molar ratio of at least 1:1.

5. A system for osmotic extraction of a solvent from a first solution, comprising:
   a forward osmosis system comprising:
      a first chamber having an inlet fluidly connected to a source of the first solution comprising the solvent;
      a second chamber having an inlet fluidly connected to a source of a concentrated draw solution, the concentrated draw solution having an osmotic concentration greater than the first solution; and
      a semi-permeable membrane separating the first chamber from the second chamber, wherein the greater osmotic concentration causes separation of the first solution and the formation of a dilute draw solution in the second chamber and a concentrated first solution comprising at least one first ionic species of solute in the first chamber;
   a first separation system fluidly coupled to the forward osmosis system downstream of the second chamber and configured to receive the dilute draw solution therefrom and to separate the dilute draw solution into draw solutes and a solvent stream comprising the solvent from the first solution and at least one second ionic species of solute;
   a pressure exchanger fluidly coupled to the separation system and configured to pressurize and transport the solvent stream;
   a reverse osmosis system fluidly coupled to the pressure exchanger and comprising:
      a first chamber configured for receiving the pressurized solvent stream;
      a semi-permeable reverse osmosis membrane coupled to the first chamber; and
      a second chamber coupled to the semi-permeable reverse osmosis membrane and configured for receiving a solvent fluxed through the reverse osmosis membrane, wherein the first chamber of the reverse osmosis system is fluidly coupled to the first chamber of the forward osmosis system to provide reverse osmosis concentrate comprising a concentrated solvent stream and the at least one second ionic species of solute to the first chamber of the forward osmosis system as at least a portion of the first solution, wherein the at least one second ionic species of solute ionically balances with the at least one first ionic species of solute to form additional draw solutes in the first chamber of the forward osmosis system;
   a second separation system fluidly coupled to the first chamber of the forward osmosis system and configured for receiving the concentrated first solution and the additional draw solutes therefrom and removing at least one of the additional draw solutes and a product stream from the concentrated first solution; and
   a first recycling system in fluid communication with the second separation system for returning the additional draw solutes to the concentrated draw solution.

6. The system of claim 5, wherein the concentrated draw solution comprises ammonia and carbon dioxide in a molar ratio of at least one to one.

7. The system of claim 5, wherein at least one of the first and second separation systems comprises at least one of a distillation column or a contact membrane.

8. The method of claim 1, wherein the at least one first ionic species of solute comprises $NH_4^+$.

9. The method of claim 1, wherein the at least one second ionic species of solute comprises at least one of $Na^+$ or $CO_3^-$.

10. The method of claim 1 further comprising the step of introducing a plurality of seeds to the first side of the forward osmosis membrane.

11. The method of claim 1, wherein the step of recycling the recovered at least one draw solute comprises mechanical vapor recompression of the recovered at least one draw solute.

12. The system of claim 5, wherein the at least one first ionic species of solute comprises $NH_4^+$.

13. The system of claim 5, wherein the at least one second ionic species of solute comprises at least one of $Na^+$ or $CO_3^-$.

14. The system of claim 5 further comprising means for introducing a plurality of seeds to the first chamber.

15. The system of claim 5 further comprising a second recycling system in fluid communication with the first separation system for returning the separated draw solutes to the forward osmosis system.

16. The system of claim 15, wherein at least one of the first and second recycling systems comprises a compressor.

* * * * *